US00RE34339E

United States Patent [19]

Osakabe

[11] E Patent Number: Re. 34,339

[45] Reissued Date of Patent: Aug. 10, 1993

[54] CATHODE RAY TUBE

[76] Inventor: Kuniharu Osakabe, 808, Midori-cho, Mobara-shi, Chiba, Japan

[21] Appl. No.: 584,742

[22] Filed: Sep. 19, 1990

Related U.S. Patent Documents

Reissue of:

[64] Patent No.: 4,772,827
Issued: Sep. 20, 1988
Appl. No.: 856,591
Filed: Apr. 25, 1986

[30] Foreign Application Priority Data

Apr. 30, 1985 [JP] Japan ..... 60-90830

[51] Int. Cl.[5] ..... H01J 29/58

[52] U.S. Cl. ..... 315/382; 315/14; 313/414

[58] Field of Search ..... 315/382, 14; 313/414

[56] References Cited

U.S. PATENT DOCUMENTS

| | | | |
|---|---|---|---|
| 3,863,097 | 1/1975 | Labudda | 315/4 |
| 3,887,834 | 6/1975 | Himmelbauer | 315/382 |
| 4,086,513 | 4/1978 | Evans, Jr. | 313/414 |
| 4,277,722 | 7/1981 | Hawken et al. | 315/382 |
| 4,319,163 | 3/1982 | Chen | 315/14 |
| 4,388,556 | 6/1983 | Rao | 315/14 |
| 4,469,987 | 9/1984 | Blacker et al. | 315/14 |
| 4,473,775 | 9/1984 | Hosokoshi et al. | 315/14 |
| 4,549,113 | 10/1985 | Rao | 315/14 |
| 4,701,677 | 10/1987 | Ashizaki et al. | 315/382 |
| 4,701,678 | 10/1987 | Blacker et al. | 315/382 |
| 4,704,565 | 11/1987 | Blacker, Jr. et al. | 315/382 |

FOREIGN PATENT DOCUMENTS

| | | | |
|---|---|---|---|
| 52-114655 | 8/1977 | Japan . | |
| 54-49862 | 4/1979 | Japan . | |
| 0158841 | 9/1983 | Japan | 313/414 |
| 0090343 | 5/1984 | Japan | 315/14 |
| 2034516 | 6/1980 | United Kingdom | 313/414 |

*Primary Examiner*—Thomas H. Tarcza
*Assistant Examiner*—David Cain
*Attorney, Agent, or Firm*—Antonelli, Terry, Stout & Kraus

[57] ABSTRACT

At least one of the focusing electrodes stages disposed between an acceleration electrodes stage and a rear focusing electrodes stage is constituted by first and second grid electrodes, confronting portions thereof having asymmetrical construction with respect to an electron beam axis. A constant focusing voltage is applied to the first grid electrode, and a dynamic focusing voltage gradually increasing or decreasing from the constant focusing voltage as the degree of beam deflection increases is applied to the second grid electrode.

10 Claims, 5 Drawing Sheets

CATHODE RAY TUBE

Matter enclosed in heavy brackets [ ] appears in the original patent but forms no part of this reissue specification; matter printed in italics indicates the additions made by reissue.

BACKGROUND OF THE INVENTION

A cathode ray tube having an evacuated envelope containing therein an electron gun for generating an electron beam, and a fluorescent surface or a target irradiated with the electron beam is used in a television receiving set, various display devices and an oscilloscope, and for recording a television picture image or the like. In such cathode ray tube, it is desirable to make substantially uniform the beam spot on the target electrode over the entire surface thereof and to reduce a halo about the beam spot for the purpose of obtaining a high quality picture image. FIG. 1 illustrates states of the beam spots on the target electrode of a conventional in-line type color television tube. As shown, a beam spot 101 at the center of the target electrode 100 has a true circular configuration, but the beam spots largely defected in the horizontal direction comprises a core 103 which is shown in black in FIG. 1. and a marginal halo portion 104. Such nonuniform beam configurations are formed due to the astigmatism and the difference in the focal distances as described later and do not form high quality pictures.

For this reason, as disclosed in Japanese Laid Open Patent Specification Nos. 85666/1979 and 85667/1979, a cathode ray tube has been proposed in which an asymmetrical lens is formed by a first grid or a second grid in the electron gun for compensating for the astigmatism caused by deflection. This measure can improve the uniformity of the beam spot over the entire surface of the target electrode, but the beam diameter at the center of the target electrode becomes larger than a case wherein a symmetrical lens system is used.

Japanese Laid Open Patent Specification No. 198832/1983 discloses an improved construction in which a front focusing electrodes stage disposed between an acceleration electrodes stage and a rear focusing electrodes stage is constituted by first to third grid electrodes, a constant focusing voltage is impressed across the first and the third grid electrodes, and a dynamic voltage which increases or decreases gradually from the constant focusing voltage as the degree of beam deflection increases, is impressed upon the second grid. This construction can obviate the astigmatism, but can not solve the problem regarding the difference in the focal distances caused by the difference in the degree of beam deflection. In order to solve the problem, an expedient has been made wherein, at the peripheral portion where the degree of deflection of the beam is large, the focusing voltage is made high to decrease the lens effect and to increase the focal length, so that the beam always focuses on the target electrode. However, this measure is complicated because of the necessary use of another dynamic voltage and a consideration to the effect of the third grid electrode which shortens the focal distance than a case not using the third grid electrode.

SUMMARY OF THE INVENTION

Accordingly, it is an object of this invention to provide a novel cathode ray tube having an electron gun capable of obviating the not point shaped astignation caused by the degree of beam deflection and a problem caused by the difference in the focal distances.

According to this invention there is provided a cathode ray tube having a plurality of electron guns each including a cathode electrodes stage, an accelerating electrodes stage, a front focusing electrodes stage, and a rear focusing electrodes stage, which are sequentially disposed in the direction of the axis of the tube, the front focusing electrodes stage including first and second grid electrodes which are successively disposed in the direction of the tube axis and each provided with apertures for passing electron beams emitted by the electron guns, means for applying a constant focusing voltage to the first grid electrode, and means for applying to the second grid electrode a dynamic focusing voltage which gradually increases or decreases as the degree of deflection of the electron beam increases, thereby asymmetrically converging the electron beam.

DESCRIPTION OF THE PREFERRED EMBODIMENTS

The embodiments of this invention will be described with reference to the accompanying drawings.

Figure 2:
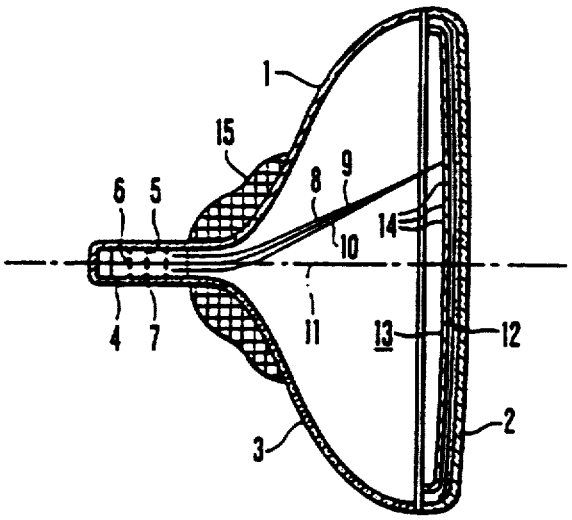
FIG. 2 is a longitudinal sectional view showing one embodiment of the cathode ray tube according to this invention.

FIG. 2 is a longitudinal sectional view showing an in-line type color cathode ray tube according to this invention. In FIG. 2, a glass envelope 1 is constituted by a face plate 2 formed with a fluorescent screen 12, funnel 3 and a neck portion 4 containing electron guns 5, 6 and 7. The axes of the three electron guns 5, 6 and 7 are contained in the same plane, that is, the plane of the sheet of drawing, and the axis of the central gun 6 is substantially coincided with the tube axis 11.

Electron beams 8, 9 and 10 emitted by electron guns 5, 6 and 7, respectively, advance straightforwardly toward the fluorenscent screen 12 and are deflected in the horizontal direction (in the plane of the sheet of drawing) and in the vertical direction by a deflection coil 15. In front of the fluorescent screen 12 is disposed a shadow mask *13* formed with a plurality of apertures 14. The electron beams are selected by the color selecting function of the apertures 14 and then reach the fluorescent screen 12 for luminescing corresponding fluorescent picture elements thus reproducing a desired picture image.

Figure 3:
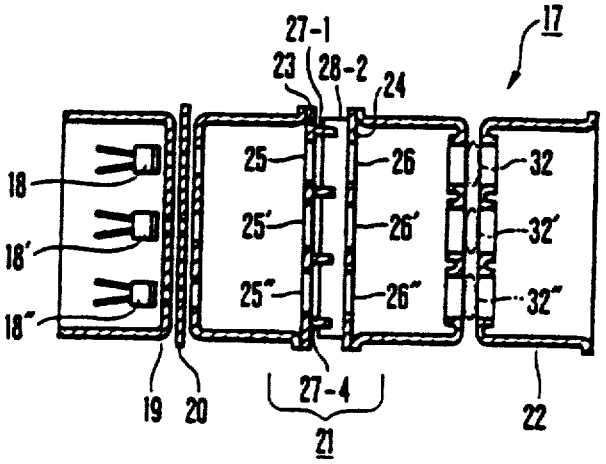
FIG. 3 is a longitudinal sectional view showing the electron gun shown in FIG. 2.
Figure 4:
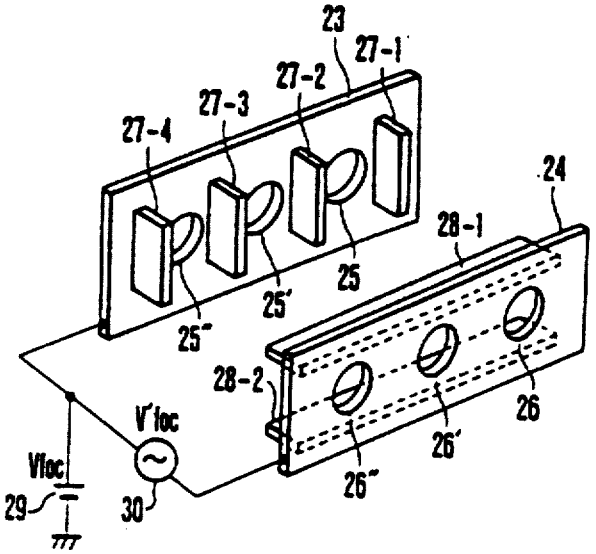
FIG. 4 is a perspective view showing the construction of the grid electrodes of the electron gun shown in FIG. 3.

FIG. 3 shows the construction (designated by reference numeral 17) of the electron guns 5, 6 and 7. The electron gun *assembly* 17 shown in FIG. 3 comprises three cathode electrodes 18, 18' and 18", a first grid 19, a second grid 20, front focusing electrodes stage 21 and rear focusing electrodes stage 22 which are arranged along a straight line in the horizontal direction. The front focusing electrodes stage 21 comprises a grid electrode 23 adjacent to the second grid 20 and a grid electrode 24 adjacent to the rear focusing electrodes stage 22. FIG. 4 shows the construction of the grid electrodes 23 and 24 and their relation. The grid electrode 23 is provided with beam passing apertures 25, 25' and 25" for passing the electron beams emitted by cathode electrodes 18, 18' and 18", respectively, and passing through apertures of the first and second grids 19 and 20. The grid electrode 23 is further provided on its surface confronting the grid electrode 24 with plate shaped projections 27-1, 27-2, 27-3 and 27-4 on both sides of beam passing apertures 25, 25' and 25", each projection having a length larger than the diameter of the beam passing apertures 25, 25' and 25" and a width a little smaller than the distance between grid electrodes 23 and 24.

The grid electrode 24 is provided with beam passing apertures 26, 26' and 26" at positions respectively opposing the beam passing apertures 25, 25' and 25" of the grid electrode 23 and plate shaped projections 28-1 and 28-2 on the surface confronting the grid electrode 23. The projections 28-1 and 28-2 extend in parallel with a line interconnecting the centers of beam passing apertures 26, 26' and 26" and have a length longer than the distance between the projections 27-1 and 27-4 at the opposite ends of the grid electrode 23. The width of each of the projections 28-1 and 28-2 is a little smaller than the spacing between the grid electrodes 23 and 24. The grid electrodes 23 and 24 are assembled such that the projections 27-1~27-4 of the grid electrode 23 are disposed between the projections 28-1 and 28-2 but not contact them, thereby forming the central portion of the front focusing electrodes stage 21 shown in FIG. 3. In FIG. 3, reference numbers 32, 32' and 32" show a symmetrical lens system (having a converging action symmetrical to the axis of the beam) formed between the front focusing electrodes stage 21 and the rear focusing electrodes stage 22.

As shown in FIG. 4, a constant focusing voltage $V_{foc}$ is applied to the grid electrode 23 from a DC source 29, whereas dynamic focusing voltage $V_{foc'}$ produced by superposing $V_{foc}$ upon the voltage of AC source 30 which varies depending upon the degree of beam deflection is applied to the grid electrode 24.

Figure 5A:
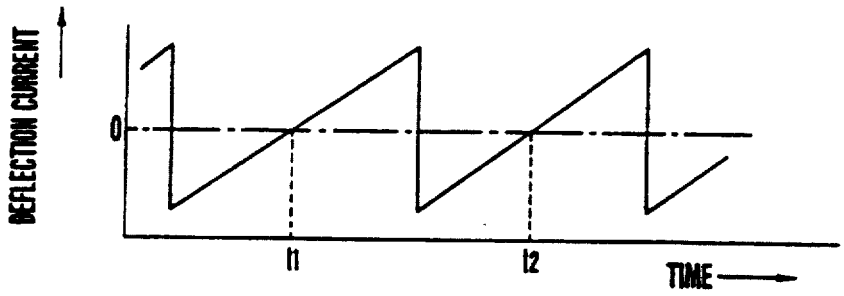
FIG. 5A shows the waveform of a deflection current.
Figure 5B:
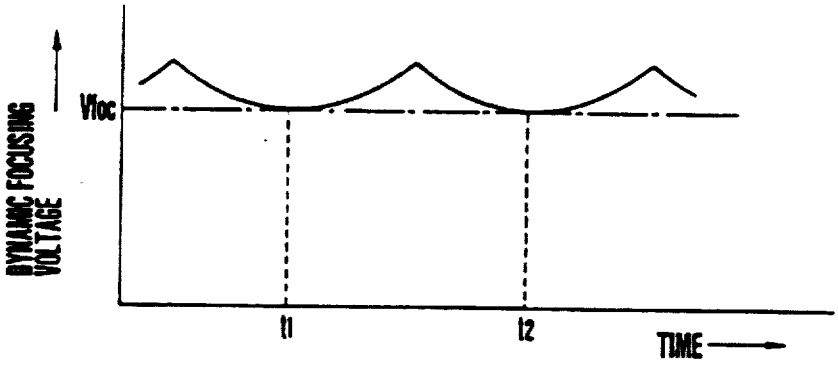
FIG. 5B shows the waveform of a dynamic focusing voltage.

FIG. 5A shows the waveform of the deflection current, while FIG. 5B shows the waveform of the dynamic focusing voltage $V_{foc'}$, both voltages being depicted along the same time axis. As shown in FIGS. 5A and 5B, the dynamic focusing voltage $V_{foc'}$ is equal to the voltage $V_{foc}$ applied to the grid electrode 23 when the deflection current is zero, that is, when the electron beam is positioned at the center of the fluorescent screen 12. The dynamic focusing voltage $V_{foc'}$ becomes larger when the electron beam is deflected from the center of the fluorescent screen due to the increase in the deflection current. Thus, when the beam spot is positioned at the center of the fluorescent screen 12, the grid electrodes 23 and 24 have the same voltage and no lens by electric field is formed between these grid electrodes 23 and 24, resulting in that the beam spot have a true circular configuration at the center of the fluorescent screen 12. According as the voltage $V_{foc'}$ rises with the increase of the degree of deflection of the electron beam, a potential difference would be created between grid electrodes 23 and 24 so that three four pole electric fields are formed between grid electrodes 23 and 24. Each four pole electric field acts upon the corresponding electron beam.

Figure 1:
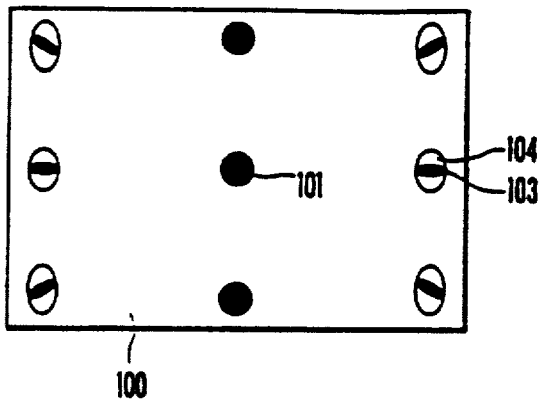
FIG.1 PRIOR ART
FIG. 1 shows configurations of beam spots on a target electrode of the prior art cathode ray tube.
Figure 6:
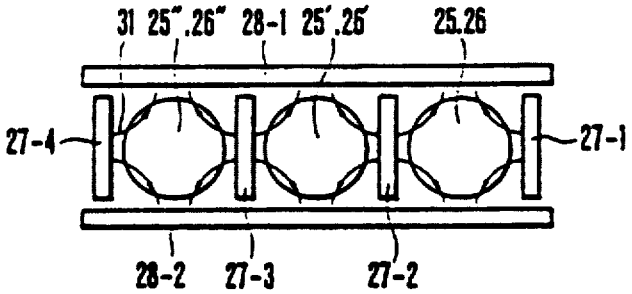
FIG. 6 is a diagrammatic representation of electric field formed between grid electrodes shown in FIG. 4.
Figure 7:
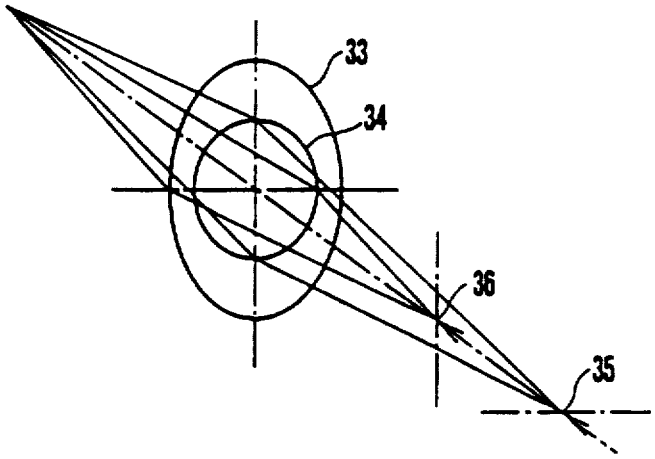
FIG. 7 is a diagram showing a focusing of an electron beam caused by a synthetic lens formed in the electron guns.

FIG. 6 shows the four pole electric fields thus formed in which arrows 31 show equipotential lines. Under these electric fields, each of the electron beams passing through apertures 25, 26; 25', 26'; and 25" and 26" is caused to diverge in the vertical direction and to converge in the horizontal direction. As a consequence, the focal points in the vertical and horizontal directions differ each other. FIG. 7 explains this. In FIG. 7, reference numeral 34 shows the cross-section of an electron beam, and reference numeral 33 shows one of three lenses obtained by equivalently synthesizing the symmetric lenses 32, 32' and 32" described above and a lens formed by the grid electrodes 23 and 24. When the electron beam 34 passes through the syntherized lens 33, it is subjected to a weak focusing effect in the vertical direction, and to a strong focusing effect in the horizontal direction. The focus 35 in the vertical direction is formed at more remote point than the focus 36 in the horizontal direction. As a consequence, the astigmatism shown in FIG. 1, which is caused by the four pole magnetic fields formed by the deflection coil 15, is eliminated.

The dynamic focusing voltage $V_{foc'}$ is set as follows. As above described in the prior art color picture tube, since the distance between the deflection center and the fluorescent screen 12 is different at the center and the peripheral portions of the fluorescent screen 12, the focal point drifts. To compensate this defect it has been the practice to increase the focusing voltage applied to the peripheral portion. According to this invention, however, the drift of the focal point caused by the difference in the focal distance can be corrected with the astigmatism by selecting the dynamic focussing voltage $V_{foc'}$ to have a suitable value. More particularly, since the astigmatism is determined by the deflection coil 15 and the glass envelope 1, by suitable design of the front focusing electrodes stage 21 such that the dynamic focusing voltage $V_{foc'}$ necessary for correcting the astigmatism coincides with the voltage for correcting the focal point drift caused by the difference in the focal points, both the astigmatism and the drift of the focal point can be corrected simultaneously.

As above described, the electron gun of this invention is possible to cause the beam spot to have substantially equal configuration to a true circle even in the peripheral portion, thereby providing the excellent beam spot configuration over the entire surface of the fluorescent screen so as to obtain clear reproduced picture images.

Figure 8:
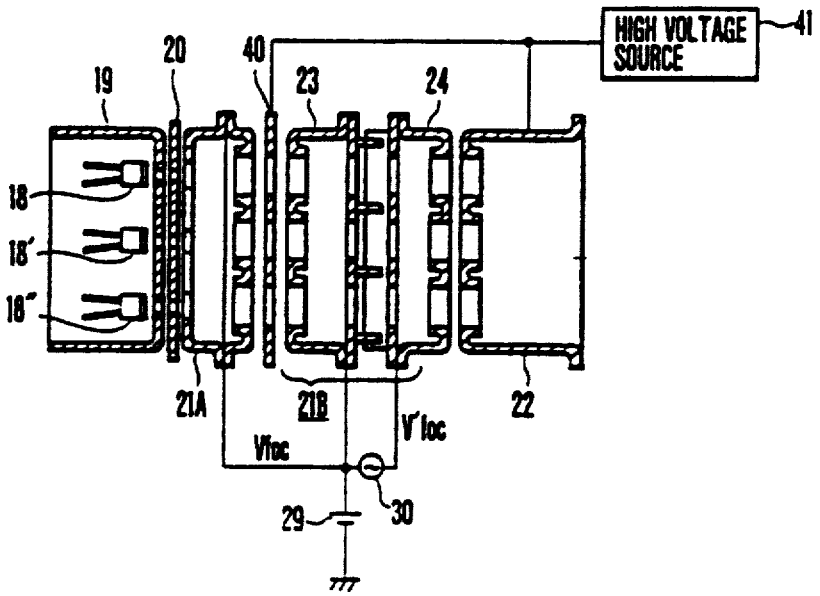
FIG. 8 is a longitudinal sectional view showing another embodiment of the electron gun according to this invention.

FIG. 8 is a sectional view of an electron gun *assembly* showing another embodiment of this invention. This embodiment shows an example of using a multistage focusing in-line type electron gun in which the front focusing electrodes stage is constituted by focusing electrodes 21A and 21B and a grid electrode 40 interposed therebetween. The [rear] focusing electrode 21B is constituted by the grid electrodes 23 and 24, similar to the front focusing electrodes stage 21 in the embodiment shown in FIG. 3. A constant voltage $V_{foc}$ is applied to the grid electrode 23 *and to the focusing electrode 21A*, while a dynamic focusing voltage $V_{foc'}$ which varies with the degree of beam deflection *is applied to the grid electrode 24*. A high voltage from source 41 is [impressed across] *applied to* grid electrode 40 and the rear focusing electrodes stage 22.

Figure 9:
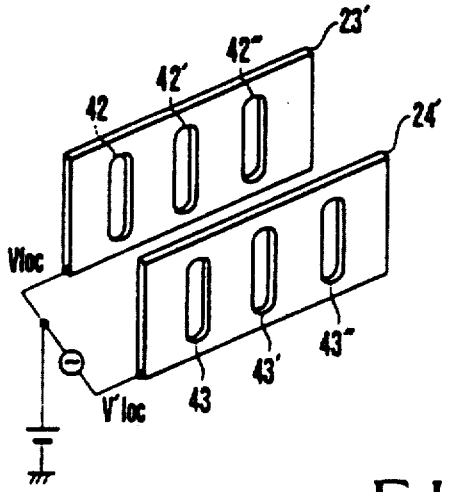
FIG. 9 is a perspective view showing another embodiment of the grid electrodes of the front focusing electrodes stage.

FIG. 9 shows still another embodiment of this invention having an advantageous effect similar to the construction shown in FIG. 4 for producing asymmetrical electric field. In FIG. 9, grid electrodes 23' and 24' are respectively formed with beam passing apertures 42, 42', 42'' and 43, 43', 43'' which are vertically elongated. A constant high voltage $V_{foc}$ is applied to the grid electrode 23', while a dynamic focusing voltage $V_{foc'}$ is applied to the grid electrode 24', whereby the grid electrodes 23' and 24' provide an effect similar to that 23 and 24 of FIG. 4.

Generally, a color picture tube utilizes three electron guns arranged on a straight line or at the apieces of a triangle. In such electron guns, one or more electrodes are integrally formed with those of the other electron guns. An electron gun having such electrodes is disclosed in U.S. Pat. No. 3,772,554, for example. This invention is especially suitable for a color picture tube having such electron guns of unitized structure.

While the invention has been described in terms of an in-line type color picture tube, it should be understood that the invention is not limited to this type and that the invention is also applicable to any type of cathode ray tube utilizing a single or a plurality of electron beams.

What is claimed is:

1. A cathode ray tube comprising:

[a plurality of electron guns] *an electron gun assembly* disposed in a neck portion of a glass envelope of said cathode ray tube, [each of] said electron [guns] *gun assembly* including a cathode electrodes stage, a front focusing electrodes stage, and a rear focusing electrodes stage, said stages being sequentially disposed in a direction of an axis of said cathode ray tube, said [first] *front* focusing electrodes stage including a first focusing electrode, a second focusing electrode [comprising] *comprised* of a first grid electrode and a second grid electrode, and a third grid electrode disposed between said first and second focusing electrodes;

means for applying a constant focusing voltage to said first focusing electrode and said first grid electrode;

means for applying to said second grid electrode a dynamic *focusing* voltage superimposed on [said] *a* constant voltage which dynamic focusing voltage gradually varies as a function of the deflection of an electron beam so as to asymmetrically converge the electron beam to produce substantially the same beam spot configuration on said tube for any deflection of said beam; and means for applying a high voltage to said third grid electrode and said rear focusing electrodes stage.

2. A cathode ray tube according to claim 1 wherein said first grid electrode is provided on a surface thereof confronting to said second grid electrode with plate shaped projections disposed on both sides of apertures for passing the electron beams, and said second grid electrode is provided on a surface thereof confronting to said first grid electrode with upper and lower plate shaped projections such that said plate shaped projections of said first and second grid electrodes are superposed perpendicularly to each other but not in contact with each other.

3. A cathode ray tube according to claim 1 wherein each of said first and second grid electrodes is formed of a plate provided with vertically elongated apertures arranged horizontally.

*4. A cathode ray tube according to claim 1, wherein said constant voltage on which said dynamic focusing voltage is superimposed is said constant focusing voltage.*

*5. An in-line type cathode ray tube comprising:*

*an electron gun assembly disposed in a neck portion of a glass envelope of said cathode ray tube, said electron gun assembly including*

*a cathode electrodes stage,*

*a front focusing electrodes stage having at least a first grid electrode and a second grid electrode, one of said first and second grid electrodes having a surface confronting the other of said first and second grid electrodes and provided thereon with first plate shaped projections for a plurality of aligned first apertures formed in said one of said first and second grid electrodes, said aligned first apertures passing electron beams emitted by said cathode electrodes stage, said first plate shaped projections extending in a direction substantially parallel with a direction of alignment of said plurality of aligned first apertures so as to sandwich said aligned first apertures, and*

*a rear focusing electrodes stage, said front and rear focusing electrodes stages being sequentially disposed in a direction of an axis of said cathode ray tube;*

*means for applying a constant focusing voltage to said first grid electrode;*

*means for applying to said second grid electrode a dynamic focusing voltage superimposed on a constant focusing voltage which dynamic focusing voltage gradually varies as a function of the deflection of an electron beam so as to asymmetrically converge the electron beam to produce substantially the same beam spot configuration on said tube for any deflection of said beam; and*

*means for applying a high voltage to said rear focusing electrodes stage.*

*6. An in-line type cathode ray tube according to claim 5, wherein the other of said first and second grid electrodes has a surface thereof confronting said one of said first and second grid electrodes and provided thereon with second plate shaped projections for second apertures formed in said other of said first and second grid electrodes, said second apertures passing the electron beams, said second plate shaped projections extending in a direction substantially perpendicular to said direction of alignment of said plurality of aligned first apertures, each of said second plate shaped projections having a width smaller than a spacing between said one and said other of said first and second grid electrodes, an adjacent two of said second plate shaped projections being disposed so as to sandwich an associated second aperture.*

*7. An in-line type cathode ray tube according to claim 6, wherein said second plate shaped projections have a length of extension larger than the diameter of said second apertures formed in said other of said first and second grid electrodes.*

*8. An in-line type cathode ray tube according to claim 5, wherein said constant focusing voltage on which said dynamic focusing voltage is superimposed is said constant focusing voltage applied to said first grid electrode.*

*9. An in-line type cathode ray tube comprising:*

*an electron gun assembly disposed in a neck portion of a glass envelope of said cathode ray tube, said electron gun assembly including*

*a cathode electrodes stage,*

*a front focusing electrodes stage, and*

*a rear focusing electrodes stage, said front and rear focusing electrodes stages being sequentially disposed in a direction of an axis of said cathode ray tube,*

*said front focusing electrodes stage having at least a first grid electrode and a second grid electrode, at least one of said first and second grid electrodes having a surface thereof confronting the other of said first and second grid electrodes and provided thereon with plate shaped projections for apertures formed in said at least one of said first and second grid electrodes, said apertures being arranged for passing electron beams emitted by said cathode electrodes stage;*

*means for applying a constant focusing voltage to said first grid electrode;*

*means for applying to said second grid electrode a dynamic focusing voltage superimposed on a constant focusing voltage which dynamic focusing voltage gradually varies as a function of the deflection of an electron beam so as to asymmetrically converge the electron beam to produce substantially the same beam spot configuration on said tube for any deflection of said beam; and*

*means for applying a high voltage to said rear focusing electrodes stage.*

*10. An in-line type cathode ray tube according to claim 9, wherein said constant focusing voltage on which said dynamic focusing voltage is superimposed is said constant focusing voltage applied to said first grid electrode.*

* * * * *